March 19, 1957
N. CORDIS
2,785,791
RECIPROCATING PADDLE-TYPE TROUGH FEEDER
Filed July 28, 1953
2 Sheets-Sheet 1
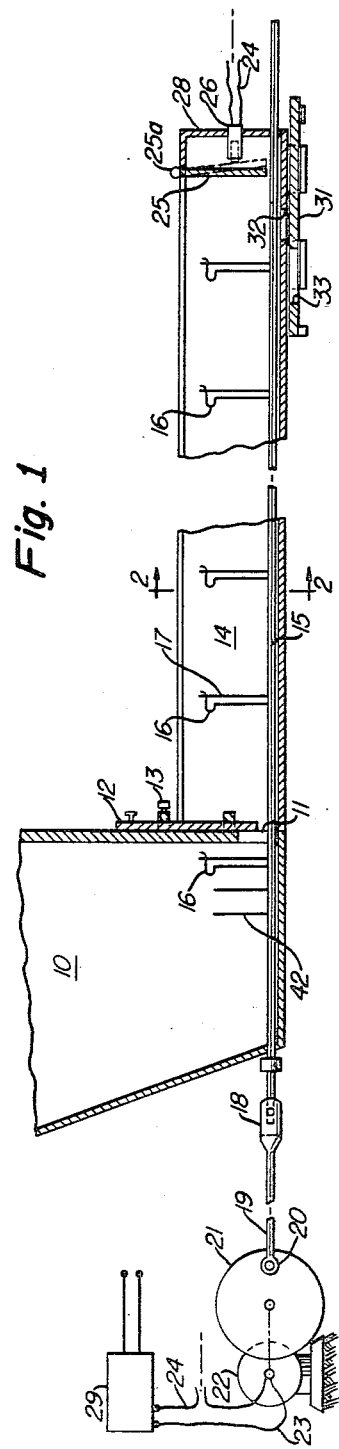
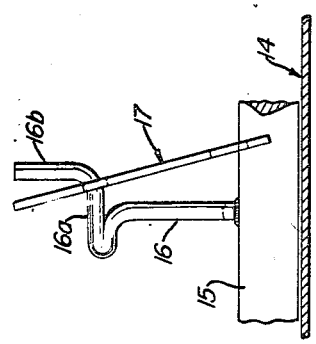
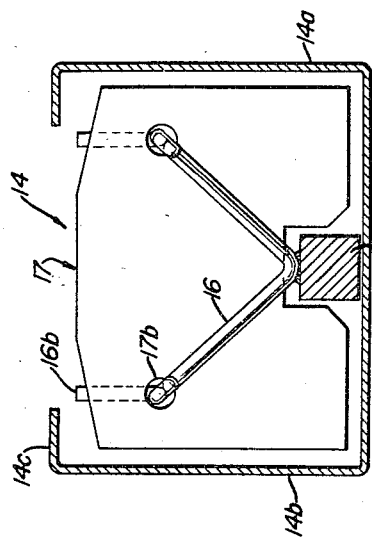
INVENTOR
Nat Cordis
BY *Everett A. Johnson*
ATTORNEY March 19, 1957     N. CORDIS     2,785,791

RECIPROCATING PADDLE-TYPE TROUGH FEEDER

Filed July 28, 1953     2 Sheets-Sheet 2

INVENTOR
Nat Cordis
BY Everett A. Johnson
ATTORNEY

United States Patent Office 2,785,791
Patented Mar. 19, 1957

2,785,791

RECIPROCATING PADDLE-TYPE TROUGH FEEDER

Nat Cordis, Silver Lake, Wis., assignor of one-half to Gerald L. Kitson, Rockford, Mich.

Application July 28, 1953, Serial No. 370,736

12 Claims. (Cl. 198—224)

This invention relates to conveyors for pulverant materials and more particularly to a feeding device for distributing such materials along a trough accessible to stock and poultry. Still more specifically the invention is an improvement in a method and means for automatically distributing feed in trough-type animal feeders.

The problem of controlled feeding of live stock such as poultry, on a large scale necessarily involves much manual attention. It is therefore a primary object of my invention to provide a feeder of large capacity in which the supply can be maintained with a minimum of manual attention. Another object is to provide a method and an automatic means for uniformly distributing an adequate supply of fresh feed within a flock feeder. Still another object is to provide an apparatus which maintains a fresh supply of feed in a trough and avoids clogging with stale feed. A further important object of my invention is to provide a means for automatically controlling the starting of the feed distributing apparatus at selected intervals and for stopping the distributing system when feed has been advanced uniformly throughout the trough system. These and other objects of the invention will become apparent to those skilled in the art as the description of my invention proceeds.

Briefly I attain the objects of my invention by providing a trough having a portion thereof in communication with a hopper. A plurality of spaced pusher paddles are pivotally carried by an operating bar which is oscillated longitudinally within the trough adjacent the bottom thereof. The operating bar or rod is provided with hangers for pivotally supporting the paddles above their centers of gravity so that the paddles may assume a generally vertical position with their backs to the upstanding hangers or support members during the pushing or feeding stroke. On the return stroke the paddles swing away from the hangers and ride over the advanced feed in the trough. Feed is discharged from the hopper into the trough at a controllable rate and withdrawal from the hopper is regulated by the motion of the reciprocating bar and its paddles to be sufficient to introduce a quantity in each pass equivalent to that normally confined between two paddles in the trough.

Further details of my invention will be described by reference to the accompanying drawings wherein:

Figure 1 is a schematic elevation, partly in section and showing the general assembly of parts;

Figure 2 is a section taken along the line 2—2 in Figure 1 showing details of the distributor paddle and paddle support in one modification;

Figure 3 is a side view showing the paddle;

Figure 4:
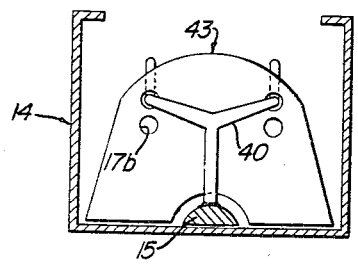
Figure 5:
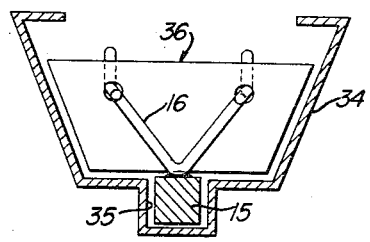
Figure 6:
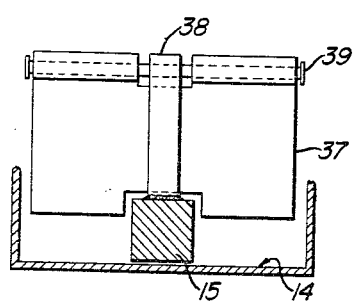
Figure 7:
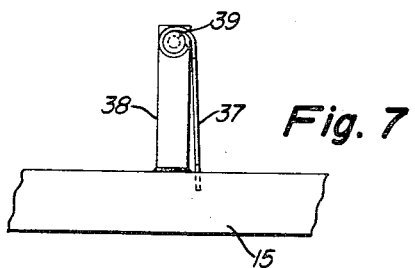

Figures 4, 5, and 6 illustrate other embodiments of the trough, paddle, paddle support, and operating rod;

Figure 7 is a side view of the modification in Figure 6; and

Figure 8:
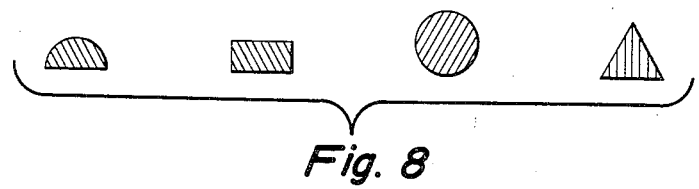

Figure 8 includes a number of shapes of cross sections which the operating rod or arm may take.

Referring to Figure 1 of the drawings, a pulverant material such as poultry feed is supplied from hopper 10 through a discharge port 11. A sliding gate 12 is held by a suitable means such as locking bolt 13, at the level to permit the desired rate of flow from the hopper 10 through the port 11 into the trough 14. The conveyor assembly, including the operating arm 15, the upstanding paddle support members 16 and the swingable paddles 17, is caused to move in a push-pull fashion within the trough 14 by a reciprocating power unit. One end of the operating bar 15 is connected to the power unit by means of a yoke 18 and a pitman link 19 with a crank pin 20 on the revolving drive plate 21 arranged to be rotated by a prime mover such as electric motor 22 which is supplied with electrical current through leads 23 and 24.

Details of the paddle supports or hangers 16 and the paddles 17 are shown in Figures 2 and 3. The operating bar 15 is shown as resting on the floor of a trough 14 having sidewalls 14a and top flanges 14b. However, the rod 15 may be disposed along the trough by other means such as within a rod-conforming channel 42 (Figure 5) or supported on a riser, either formed integral with the trough or supported on the flat bottom of the trough. The riser itself may have a rod-guiding channel.

Welded, or otherwise fixed to the upper face of the operating bar 15 is a generally V-shaped support formed of heavy wire. It has the form shown in Figures 2 and 3 to provide a paddle-supporting ledge 16a and a paddle-retaining hook or stop 16b. Openings 17b, above the center of gravity of the paddle 17 receive the hooks 16b so that the paddle rests on the two lateral ledges 16a. A central cut-out 17a permits the paddle 17 to straddle the operating bar 15 so that the bottom edge of the paddle 17 is near the trough bed on the feed-advancing stroke.

In a typical installation, the trough 14 may be about 3.25 inches wide, and 2.75 inches deep with two flanges 0.375 inch wide. The paddle 17 may be about 2.75 inches wide, and from about 2.25 to 1.75 inches high. The height of the paddle hanger and the location of the openings 17b will determine the depth of feed permitted to accumulate below the paddles on the bottom of the trough. If desired, two sets of holes 17b can be provided for hanging the paddles, either deep or shallow, within the trough on the hangers. One such arrangement is illustrated in Figure 4 but the two sets of 17b can of course be applied to the paddles shown in Figures 2 and 5. Also the paddles can be supplied with a scored bottom portion to permit the easy shortening of the paddle to fit the particular needs of the operator.

When the port 11 is open as shown and the operating rod 15 of the conveyor assembly is reciprocated by the oscillating power unit, the paddles 17 first assume the vertical position of Figure 1. In this position the paddles push feed away from the hopper 10 along the trough 14 to advance the feed an increment of the total length of the trough, for example an increment of about 5 to 10 inches. This corresponds to the spacing of the hangers 16 and paddles 17 along the operating rod 15.

The direction of motion of the operating rod 15 is cyclically reversed by the oscillating or reciprocating power unit including in the illustrated embodiment: the motor 22, the drive plate 21, the crank pin 20, and the link 19, terminating with the yoke 18. Upon the return or "pull" stroke of the arm 15, the paddles 17 lift up as in Figure 2 and ride over the feed advanced within the trough 14 by the previous "push" or delivery stroke of the operating arm 15.

This cycle is repeated at a rate of from 30 to 50 strokes a minute with feed being supplied to the inlet end of the trough 14 by any suitable means from a hopper. As illustrated, this is done by gravity flow through port 11 below adjustable gate 12. When the feed already discharged from the port 11 is moved, more feed comes in to take its place but it does not continue to discharge if the feed piles up in front of port 11, i. e., when the operating rod and paddles are at rest. Until the trough is filled to desired extent the operating arm 15 continues to oscillate within the trough 14 (and along the bottom of the hopper 10), bringing feed from the hopper into the trough 14 and advancing feed from the inlet end to the terminal end. Finally the feed advanced by the paddles reaches and piles up against the hinged switch-actuating end plate 25.

The weight of the hinged plate 25 at the end of trough 14 is sufficient to hang vertically but when feed is pushed against it by the paddles 17 of the conveyor assembly, the plate swings toward the end of the trough 14 and depresses switch 26. This switch may suitably be of the spring-loaded micro type and is in the lead 24 to motor 22 or operates an independent on-off switch (not shown) which controls the actual power to the motor. Opening of the switch, in any event, cuts off the power, thereby automatically stopping the motor 22 and hence the push-pull of the operating arm 15. A timer 29 controls the power source to the motor 22 to run the motor at selected times for selected periods. However, the switch 26 overrides the timer as described above during the feeding period and stops the conveyor assembly when the trough 14 becomes full. If it is desired to by-pass the switch 26 for any reason, it is merely necessary to swing the plate 25 upwardly about its hinge 25a and out of the path of the feed. This may be done for example when it is desired to remove all feed from the trough 14, by opening the sliding trap door 31 to bring the ports 32 in the trough into register with the port 33 in the door 31 and by closing the port 11.

It may be desired to have several trough units in series, fed from a single hopper as shown in Figure 1. In that event the port 32 is exposed and the feed advanced in the trough is discharged through the port 32 onto the inlet end of another trough unit similar to trough 14 described above. The switch plate 25 on the first unit trough is lifted to by-pass the switch 26 but a corresponding plate and switch on the final trough section in the series would control the reciprocating power unit.

The operating bar 15 as shown in the drawings is placed within the trough 14 and out of the way of the feeding poultry. Since it is in the trough it rides on or is submerged in the advancing feed making for silent operation and avoiding any interference with the poultry. The paddles swing silently and are either pushing feed or are slipping quietly over the advanced feed.

Referring to the operating bar 15, it may have various forms, for example such as half-round, rectangular, round, and triangular cross section as illustrated in Figure 8. On the portion of the arm 15 running within the hopper 10 are a plurality of agitator fingers 42 which prevent bridging of the feed. If desired a hanger and paddle unit may be arranged within the hopper as illustrated in Figure 1 to urge the feed therefrom as the supply gets low. The free end of the arm 15 extends through a slot in the end wall 28 of the trough 14, the slot serving as an end guide for the reciprocating rod 15. Alternatively a sleeve (not shown) may be fixed to the bed of the trough near the terminal end to receive the reciprocating end of the arm. Other hold-downs can of course be devised by those skilled in the art.

In Figure 5, I have illustrated another type of trough 34 wherein the operating arm 15 is carried within a longitudinal channel 35. In this arrangement the paddle 36 has a straight bottom edge and outwardly flaring side edges. It is contemplated, however, that any one of the shapes of operating bars 15 may be used with paddles and troughs in various combinations. When the paddle edges and side walls of the trough are not substantially parallel, such as in Figure 4, a larger volume of feed can be accumulated or distributed along the sides of the trough than is the case of the modification in Figures 1, 2, and 3. Also the bottom edge of the paddle can be spaced a substantial distance from the trough bottom as shown in Figure 6.

With reference to Figures 6 and 7, I have there illustrated a hinge-type hanger for supporting the paddles including a single upright support 38 with a cross arm pivot 39 adapted to be encircled by the rolled upper edge of the paddle 37. In Figure 4 a modified T or Y hanger 40 supports the paddle 41 on the operating arm 15 (the half-round of Figure 8) within a trough 43 like the trough 14 of Figure 2.

The operating arm 15 is rigid and may suitably be made of iron, other metal, wood, or other material. It may be solid in cross section or tubular. The troughs 14 are of sheet metal, such as galvanized iron, aluminum, or copper, etc. The paddle supports are of heavy or stiff wire, rod stock, or the like. The paddles are of light plate stock, being relatively thin and light so as to ride over the advanced increment of feed as described. Other materials will be apparent to those skilled in the art after having the benefit of the description of my invention. Likewise other modifications of apparatus components and equivalent elements thereof can be substituted for the illustrated examples without departing from the spirit of my invention.

What I claim is:

1. A conveyor system for flowable pulverant materials comprising in combination a trough means, an operating bar arranged for reciprocating movement longitudinally within said trough, a plurality of paddles extending transverse to said trough and in longitudinally spaced relation to each other along said trough, a plurality of paddle hangers carried by said operating bar, each such hanger suspending a paddle to permit its free swing from said hanger, and means for reciprocating said operating bar and said suspended paddles in unison and in a pushing stroke and a return stroke, whereby each of said paddles assume alternately a substantially vertical position in a feed-advancing array and an inclined position on the return stroke to ride over the advanced feed in said trough.

2. The system of claim 1 wherein said paddles are suspended with their bottom edges close to but spaced from the bed of said trough.

3. The system of claim 1 wherein the said hangers comprise V-shaped bifurcated wire members, the upstanding free ends thereof supporting plate-like paddles provided with two hanger-receiving openings above the center of gravity of the plate-like paddles.

4. The system of claim 1 wherein the trough has vertically extending side walls, the paddles are substantially rectangular and substantially co-extensive with the cross section of said trough, and the operating bar is reciprocated on the bed of the trough.

5. A poultry feed distribution system comprising in combination a feed trough means accessible to poultry, means for advancing feed through said trough means comprising a plurality of pusher paddles suspended across the trough and in spaced relation to each other along a length of a trough in said trough means, an operating bar supported on the bottom of said trough, paddle support hangers carried by said bar and upstanding therefrom to support said paddles with their bottom edges spaced from the bottom of the said trough, and means for reciprocating said operating bar in a pushing stroke and a return stroke, said operating bar moving in the advancing feed within the trough, whereby said paddles assume a vertical position during the pushing stroke and advance feed in said trough and pivot upwardly about said hangers on the return stroke so as to ride over the advanced feed in said trough.

6. The apparatus of claim 1 wherein the said paddles are suspended on V-shaped wire supports fixed to said operating bar and said paddles each comprises generally rectangular plates with a major portion above said operating bar at all times, said paddles having a cut-out along the lower edge to straddle said operating bar and with spaced pivot-receiving openings near the top edge for pivotal suspension on said V-shaped wire supports.

7. In a poultry feed distribution system of the type employing an open-topped trough accessible to poultry, a hopper discharging into said trough, and means for advancing feed from said hopper through said trough, the improved means for advancing said feed comprising in combination an operating bar adapted to be reciprocated along the bottom of such trough, a plurality of pivoted pusher paddles, upstanding supports for said paddles carried by said operating bar, means for pivotally mounting said paddles individually on said supports adjacent their upper edges, said paddles all being on the same side of the said supports and substantially above the bottom of said operating arm, and means for oscillating said operating bar within said trough whereby the said paddles hang vertically abutting said supports on a pushing stroke and swing upwardly away from the said supports upon the return stroke.

8. The apparatus of claim 1 wherein the length of the stroke of the operating bar is greater than the distance between adjacent pusher paddles on said bar.

9. The apparatus of claim 1 wherein the said operating bar has a stroke of about 7 inches and the said paddles are spaced a distance of about 6 inches.

10. In a poultry feed distribution system of the type employing an open-topped trough accessible to poultry, a hopper means discharging into said trough, and means for advancing feed from said hopper means along said trough, the improved means for advancing said feed comprising in combination an operating bar adapted to be reciprocated along the bottom of such trough, a plurality of pivoted pusher paddles, upstanding supports for said paddles carried by said operating bar, means for pivotally mounting said paddles individually on said supports adjacent their upper edges, said paddles all depending from the said supports and having a bottom edge substantially above the bottom of said trough, and means for oscillating said operating bar within said trough whereby paddles hang vertically abutting said supports on a pushing stroke and swing upwardly away from the said supports upon the return stroke.

11. The conveyor system of claim 1 wherein the trough means includes a plurality of trough units each having an operating bar, a port at an end of at least one unit discharging into the next unit, an electrical switch means controlling the means for reciprocating said operating bars, and a hinged end plate adjacent the end of the final unit adapted to control said switch means in response to the pile-up of conveyed materials at said end.

12. A poultry feed distribution system comprising in combination a feed trough means accessible to poultry, means for advancing feed along the bottom of said trough means comprising a plurality of pusher paddles suspended transverse to the longitudinal axis of the trough and in spaced relation to each other along a length of a trough in said trough means, an operating bar supported along the bottom of said trough and centrally thereof, paddle support hangers carried by said bar and upstanding therefrom to support said paddles with their bottom edges spaced from the bottom of the said trough, and means for reciprocating said operating bar in a pushing stroke and a return stroke, said operating bar moving in the advancing feed within the trough, whereby said paddles assume a vertical position during the pushing stroke to advance feed in said trough in the path of the paddles and pivot upwardly about said hangers on the return stroke so as to ride over the advanced feed.

References Cited in the file of this patent

UNITED STATES PATENTS

| | | |
|---|---|---|
| 351,965 | Conger et al. | Nov. 2, 1886 |
| 1,366,434 | Thomson | Jan. 25, 1921 |
| 1,423,990 | Bremer et al. | July 25, 1922 |
| 1,440,378 | Davis | Jan. 2, 1923 |
| 2,043,595 | Raymond | June 9, 1936 |
| 2,494,626 | Nickerson | Jan. 17, 1950 |
| 2,593,340 | Petraske | Apr. 15, 1952 |
| 2,646,023 | Virgil | July 21, 1953 |